No. 643,711. Patented Feb. 20, 1900.
W. F. CARLTON & H. W. LOCKE.
SWING BACK FOR PHOTOGRAPHIC CAMERAS.
(Application filed Feb. 11, 1899.)

(No Model.) 4 Sheets—Sheet 1.

No. 643,711. Patented Feb. 20, 1900.
W. F. CARLTON & H. W. LOCKE.
SWING BACK FOR PHOTOGRAPHIC CAMERAS.
(Application filed Feb. 11, 1899.)
(No Model.) 4 Sheets—Sheet 2.
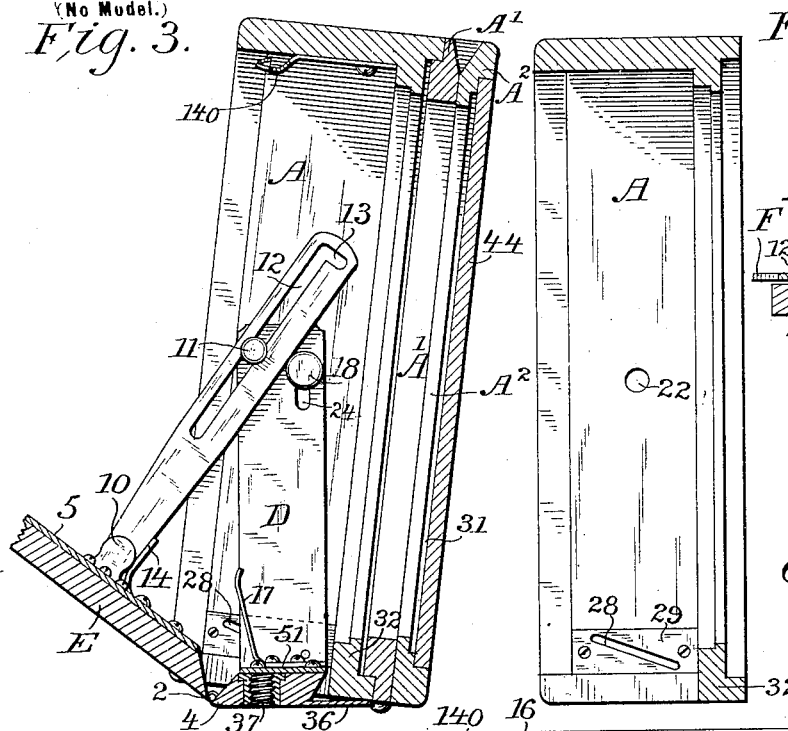

No. 643,711. Patented Feb. 20, 1900.
W. F. CARLTON & H. W. LOCKE.
SWING BACK FOR PHOTOGRAPHIC CAMERAS.
(Application filed Feb. 11, 1899.)
(No Model.) 4 Sheets—Sheet 3.
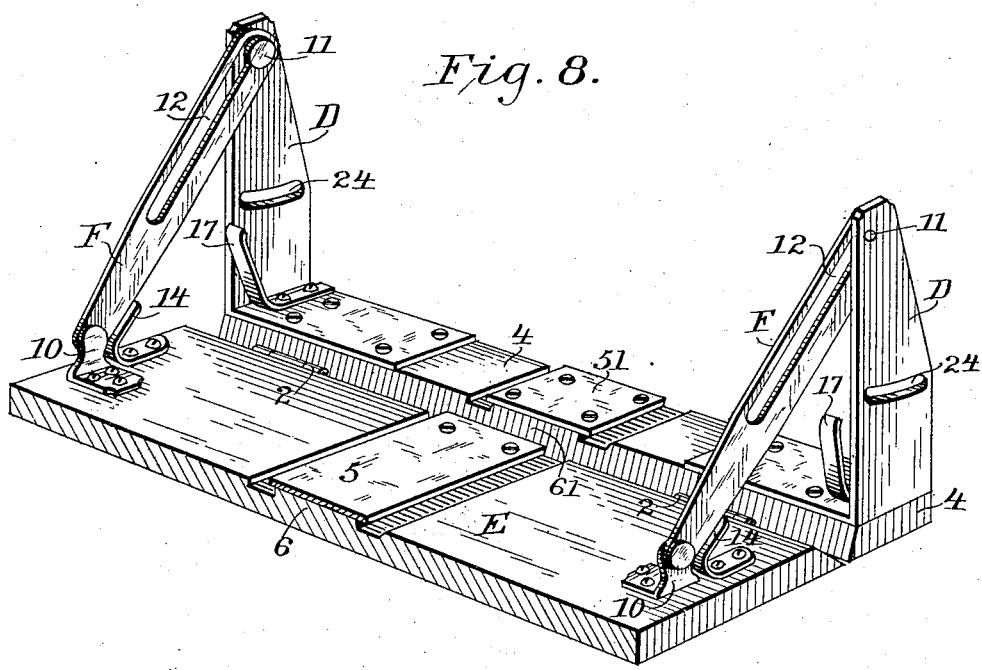
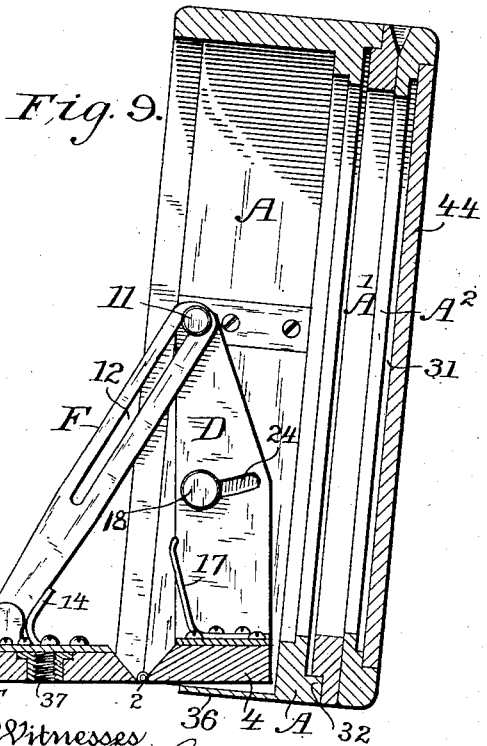
Witnesses
Jos. B. Latimer
Theo. F. Snell
Inventors
William F. Carlton
Harvey W. Locke
by Arthur F. Browne
their Attorney No. 643,711. Patented Feb. 20, 1900.
W. F. CARLTON & H. W. LOCKE.
SWING BACK FOR PHOTOGRAPHIC CAMERAS.
(Application filed Feb. 11, 1899.)
(No Model.) 4 Sheets—Sheet 4.
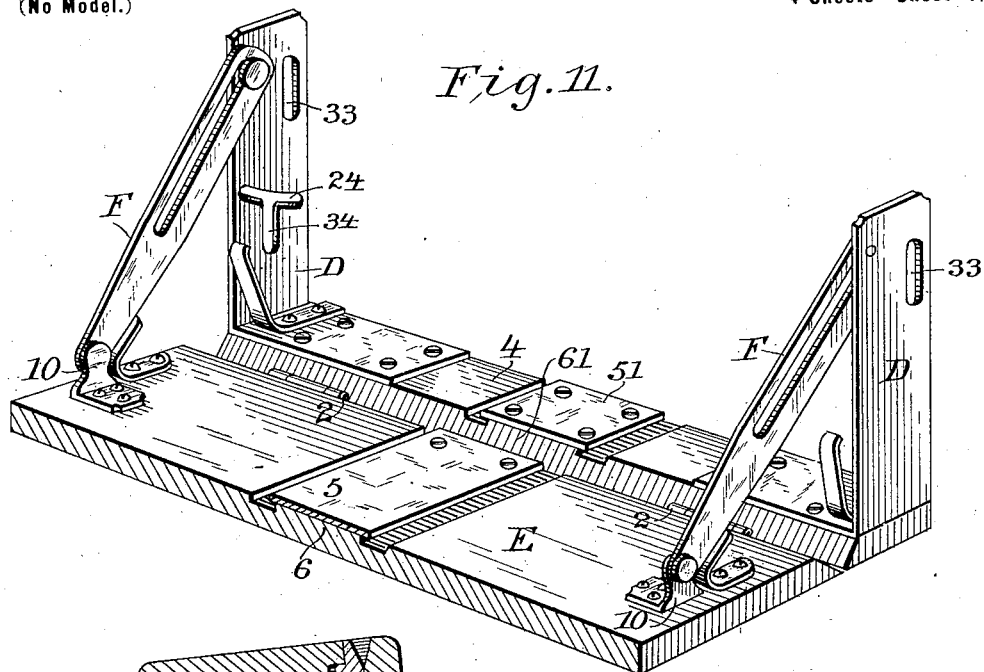
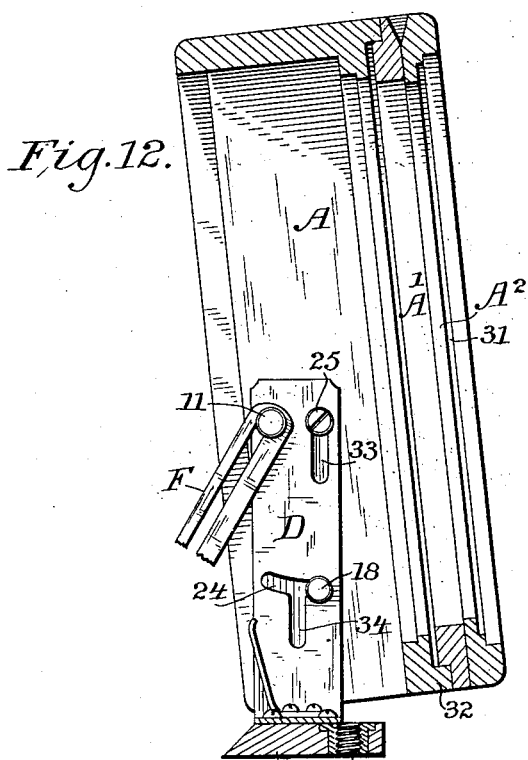
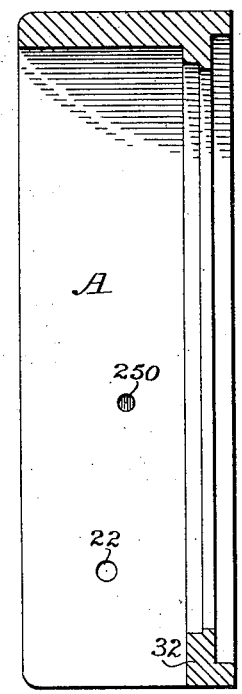
Witnesses
Jos. S. Stiner
Theo. T. Snell
Inventors
William F. Carlton
Harvey W. Locke
by Arthur L. Browne
Their Attorney
THE NORRIS PETERS CO., PHOTO-LITHO., WASHINGTON, D. C.

UNITED STATES PATENT OFFICE.

WILLIAM F. CARLTON AND HARVEY W. LOCKE, OF ROCHESTER, NEW YORK; SAID LOCKE ASSIGNOR TO SAID CARLTON.

SWING-BACK FOR PHOTOGRAPHIC CAMERAS.

SPECIFICATION forming part of Letters Patent No. 643,711, dated February 20, 1900.

Application filed February 11, 1899. Serial No. 705,287. (No model.)

*To all whom it may concern:*

Be it known that we, WILLIAM F. CARLTON and HARVEY W. LOCKE, citizens of the United States, residing at Rochester, in the county of Monroe and State of New York, have invented certain new and useful Improvements in Swing-Backs for Photographic Cameras, of which the following is a specification.

This invention relates to photographic cameras in which the "back"—that is to say, the portion of the camera which supports the photo-sensitive surface—can be swung into different positions relatively to the front or lens-carrying portion of the camera, the purpose of such "swing-back" being to enable a tall object being photographed to appear in the picture in proper perspective. The present invention consists in the improved construction of the swing-back mechanism.

For the purpose of setting forth the present improvements they will be described as applied to a camera having an adjustable lens-carrier connected with the swing-back by a collapsible bellows.

The improvements are illustrated in the accompanying drawings, wherein—

Figure 1:
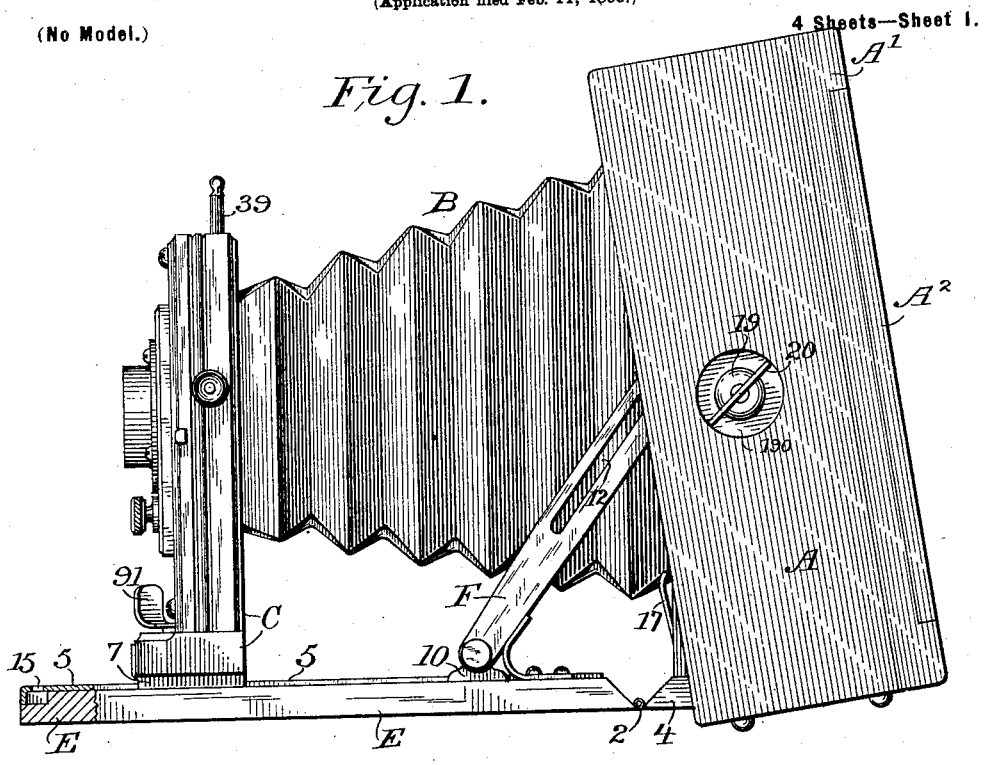
Figure 2:
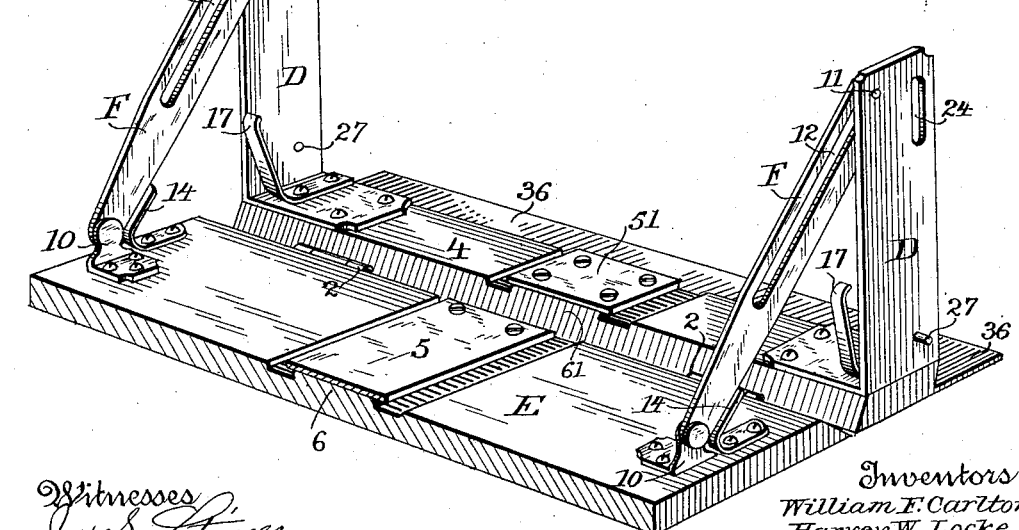

Figure 1 is a side view, partly in section, of a camera open or extended for use. Fig. 2 is a perspective view, partly in section, of the camera-bed, the supports for the camera-box, and the cross-piece through the intermediary of which the said bed and supports are connected. Fig. 3 is a vertical section taken longitudinally of the bed and showing the camera-box, the camera-box supports with their cross-piece, and a portion of the camera-bed. Fig. 4 is a vertical section of the camera-box. Fig. 5 is a face view of the camera-box with the camera front and bellows incased therein, the camera-bed and its supports, with their cross-piece, being removed. Figs. 6 and 7 are detail views. Figs. 8, 9, and 10 are views of a modified form of camera, corresponding, respectively, with Figs. 2, 3, and 4, except that in Fig. 9 a smaller part of the camera-bed is shown. Figs. 11, 12, and 13 are similar views of another form of camera, except that no part of the camera-bed is shown in Fig. 12.

Referring first to Figs. 1 to 7, inclusive, the camera comprises as its main structural features the swing-back A, the camera-bed E, the camera-front C, which carries the lens, and the bellows B, connecting the camera-front to the swing-back.

The camera-bed E is preferably hinged by hinges 2 to a cross-bar 4, so that the bed may be swung upwardly to constitute a cover for the camera when not in use. When the camera is in use and the bed E is swung down, the cross-bar 4 constitutes, essentially, a portion of the camera-bed. Rising from the cross-bar 4 are vertically-extending sheet-metal supports D D at opposite ends and rigidly secured thereto, to which the swing-back is hinged. The portion E of the camera-bed, which constitutes the cover of the camera when closed, is locked in its open position (so that the cross-bar 4 constitutes a rigid prolongation thereof) by means of links F F, which are pivoted at their lower ends to metal ears 10 10, carried by the bed E and which are respectively provided with longitudinal slots 12 12, having locking-notches 13 (see Fig. 3) at their upper ends, said slots and notches engaging headed pins 11, carried by the supports D D, respectively. The longitudinal slots 12 enable the cover E to be swung up and down, and when the cover is in its open position the locking-notches 13 catch upon the pins 11, and thereby lock the cover in its open position. Springs 14, carried by the cover E and engaging the links F F, cause the automatic locking engagement of the locking-notches 13 and the pins 11 when the cover is swung fully open. The cross-bar 4 and supports D D constitute an intermediate frame between the camera-bed proper and the swing-back camera-box.

The swing-back E, which carries the sensitive photographic surface and which is pivotally connected with the supports D D of the camera-bed, is formed as a rectangular box open at front, back, and bottom, and which constitutes a casing for the bellows and camera-front when the camera is not in use. The swing-back, which is thus also the camera box or casing, may be constructed so as to carry any kind of sensitive photographic surface. It is shown as open in the back and adapted to receive a reversible back-frame A' for retaining photographic-plate holders, said reversible back-frame being shown as provided with a spring-actuated receding and plate-holding device $A^2$, having a groove 31 to receive a ground-glass plate (not shown) and a lid or panel 44, which permits the exposure of the ground-glass plate when focusing the camera. This construction and arrangement of reversible back-frame are well known in the art. The panel 44 also constitutes a closure for the back of the camera when it is in use. The swing-back camera-box A is open at its bottom, with the exception of the cross-bar 32 at its rear, which constitutes a portion of the support for the back-frame A'. The swing-back is hence a swinging camera-box, which is exterior to the supports D D, which are therefore inside supports inclosed and concealed by the swinging camera-box.

When the camera is not in use, the open front of the camera-box A is closed by the cover E, which has at its forward end a lip 15, (see Fig. 1,) adapted to engage a spring-catch 140 (see Fig. 3) on the camera-box. The spring-catch is depressed to release the cover E by means of a pin 16, whose manipulating-head is normally covered by the usual leather or other cover of the camera-box, which is not shown in the drawings, since it is too well known in the art to require illustration. When the catch 140 is depressed and disengaged from the lip 15, the cover E is automatically swung out some distance by means of springs 17, shown as carried by the cross-bar 4 (or, more accurately, the portions of the metal secured to the cross-bar, from which the supports D are turned up) and which press against the cover when it is closed.

The camera-front C, connected to the swing-back by means of the collapsible bellows B, is adapted to slide along the cover E when said cover is opened for the purpose of securing the proper focus, said cover (when constituting a portion of the camera-bed) thus also constituting a focusing-board. The cover E is provided with a runway for the camera-front C, consisting of a ridge 6 and an overhanging metal plate 5, and the cross-bar 4 is provided also with a ridge 61 and an overhanging plate 51, constituting prolongations of the runway on the cover E. The camera-front has claws 7, which underlie the projecting guiding edges of the plates 5 and 51, so that the camera-front may slide freely back and forth, but is prevented from accidental detachment. The camera-front is clamped in position by means of a clamping-plate 8, carried thereby, which is forced down against the plates 5 and 51 by means of a clamping-screw 9, provided with a manipulating-handle 91. The camera-front is shown as provided with a vertically-adjustable lens-carrier, which slides upon vertical rods 39, constituting part of the camera-front, and which can be secured in any desired position of adjustment by means of the set-screw 40. The lens-carrier is shown as provided with usual devices, such as the handle 41, for shifting the usual diaphragm which adjusts the size of the exposing-aperture, a milled head 42 for setting the exposing-shutter, and a handle 43 for tripping the shutter when a picture is to be taken.

The swing-back is pivotally connected to the inside supports D D near the upper ends of said supports, and said supports terminate at about the middle of the swing-back, so that the axis on which the swing-back turns is approximately in line with the middle line of the sensitive surface, which is desirable, so as to secure the best results. The swinging of the back is, as usual, for the purpose of enabling a tall object being photographed to appear in the finished picture in proper perspective, and the best results are secured by causing the swing-back to turn on an axis approximately in line with the middle of the sensitive surface, and hence in line with the middle of the finished picture. For reasons also which will hereinafter be explained it is desirable that the swing-back when constituting also the camera box or casing, as is here the case, should have a bodily movement of translation—that is to say, an up-and-down movement. It is also important that the camera-box or swing-back should be fastened in any position of inclination to which it may be adjusted. To enable these results to be accomplished, the swinging camera-box is connected with the supports D, carried by the camera-bed, in the following manner: The sides of the swinging box are exterior to the supports D and to the cross-bar 4, so that they house and conceal them. The swinging box A is secured to the inside supports D in the position to which said box may be swung by a double-headed screw-and-nut fastener G G', which passes transversely through the wall of the box A and the corresponding inside support D and which is composed of the screw G, with an inside head 18, (of any suitable form,) and the nut G', with an outside thumb-head 19, exposed outside the camera-case and of a form to admit of ready manipulation, being provided, preferably, with wings 20, formed by a diametrical rib for manipulation by the photographer's fingers. There is a wear-plate 190 on the camera-box under the head 19, and the hub 21 of the nut G' passes through a round hole 22 (see Fig. 4) in the wall of box A, while the portion 23 of the shank of screw G is located in a slot 24 in the support D. In order to prevent the turning of the screw G when the fastener is closed or clamped, it is provided with the squared or angular portion 23, which fits in the slot 24, so that it cannot revolve therein. By unscrewing the nuts G' the fasteners are loosened, and the swinging box may then be turned to any desired position within its range of movement. By then again tightening up the nuts G' the supports D are securely clamped against the inner walls of the sides of the swinging box, thus holding the swinging box in position.

It will be noted that the cross-bar 4, constituting a portion of the camera-bed, also constitutes the bottom of the camera-box when it is closed. It is important when the camera is entirely closed that it should be wholly and completely closed, with no opportunity for access to its interior. Now it is evident that in case the swing-back is so constructed as to constitute also the camera box or casing and in case it should be hung upon a simple pivot it would be necessary to leave a gap at the bottom in order to permit the swing of the box. Therefore that there may be a complete closure it is necessary that there should be a vertical rise and fall of the swinging-box as it swings. By thus providing a vertical rise and fall the cross-bar 4, constituting the bottom of the camera-box, may be provided, as shown, with a projecting lip or leaf 36, which extends immediately beneath the bottom of the cross-bar 32 at the lower end of the camera-box, which lip or leaf closes at all times the gap between said cross-bar 32 and the said cross-bar 4. To permit this vertical sliding movement of the camera-box the screw-shanks 23 of the fasteners play in the vertical slots 24 of the inside supports, already referred to. If, however, this pivotal and sliding connection alone were employed, two distinct movements would be required in setting the swing-back—first the vertical movement and then the tilting movement. To compel the simultaneous performance of the two movements, the camera-box is provided on each inner side wall with a metal plate 29, (see Fig. 4,) having an inclined slot 28, in which freely plays an outwardly-projecting stud 27, (see Fig. 2,) carried by the camera-bed and preferably located on the adjacent inside support D. By virtue of this slot-and-stud connection whenever the camera-box is tilted it is compelled to move automatically up and down, and the vertical slots 24 permit this vertical movement. The slots 28 limit the extent of swing.

It will be noted that the pivotal connection (consisting in the illustrated connection of the fasteners G G') between the camera-bed and the swing-back has a movement relatively to the camera-bed and that the studs or pins 27 and guides or slots 28 constitute a supplementary connection between the camera-bed and swing-back, which causes said pivotal connection to automatically move relatively to the camera-bed when the swing-back is tilted. This connecting mechanism between the camera box and bed also enables the optical advantage to be gained of having the axis of swing substantially coincident with the middle line of the sensitive surface itself, which is of course in a plane back of the fasteners G G' and back of the supports D. The axis of swing would be exactly in the plane of the sensitive surface if the guides or slots 24 and 28 should both be concentric with the desired line in said plane; but, as shown in Figs. 2, 3, and 4, the slots 24 and 28 are straight and make an angle with each other, or, in other words, are respectively concentric with axes which are at infinite distances from their respective slots and are also at an infinite distance from each other, and consequently the axis of swing shifts, each point on the sensitive surface moving in a compound curve; but practically, with the slots in the positions represented, the axis of swing shifts very little, so that the center line of the sensitive surface has only an insignificant movement, and it is ordinarily more convenient to make straight slots or guides for the traveling pins than it is to make curved slots or guides; but curved guides or slots may of course be used.

The cross-bar 4 is shown as provided with an interiorly-threaded socket 37 to enable it to be attached in the ordinary way to a tripod or other support.

To take a picture, the bed E will be dropped, (extended.) Then the camera-front will be moved out until the image is properly seen on the ground glass, (which will have been exposed by removal of the panel 44,) and, if necessary, the camera-box will then be swung through its pivotal connections with the supports D. As this swing need change but little or not at all the distance of the center line of the ground glass from the lens, little or no further adjustment of the camera-front will be necessary by reason of the swing. The center line of the ground glass becomes the center line of the sensitive surface when the film or plate holder is in place.

When the camera is not in use, the bellows is collapsed, the cover E is turned up and locked, and all operative parts are then inclosed in a compact dust-proof casing. The camera has thus the threefold advantage, first, of being able to have the axis of swing at or near the middle of the sensitive plate or film; second, of concealing the adjustment devices (except one or more heads for controlling them) within the swinging camera-box, and, third, of incasing the camera front and bellows in said box.

In the modification illustrated in Figs. 8, 9, and 10 the swinging camera-box has only a swinging movement and does not have an up-and-down movement. In this construction the swinging camera-box is pivotally connected with the supports D by the same pivot-pins 11 with which the links F F are connected, the box being provided with apertures 110, (see Fig. 10,) through which the pins 11 extend. The fasteners in this case merely serve as clamping and limiting devices and not as pivots for the swinging box. Only the inner clamping-head 18 of one of the fasteners is shown, Fig. 9, since the fasteners here employed are just like those shown in Fig. 7. The shank of each fastener passes through a slot 24 in the corresponding support D, which slot is concentric with the pins 11, so as not to interfere with the swing of the camera-box, and the length of this slot determines and limits the extent of swing. The lip or leaf 36, which covers the joint between the bottom cross-piece 32 of the swinging box and the cross-bar 4 of the camera-bed, is secured to the cross-piece 32 and extends beneath the cross-bar 4, being located sufficiently far below said cross-bar 4 as not to interfere with the swing of the box. Because of this location of the lip or leaf 36 the socket 37 for securing the camera to a tripod or other support is transferred to the cover E. In other respects this modification is similar to the construction shown in Figs. 1 to 7, inclusive.

Figs. 11, 12, and 13 illustrate a modified construction wherein the swinging box or swing-back is pivotally and slidingly connected with the camera-bed through the supports D, as in the construction shown in Figs. 1 to 7, inclusive, but by the aid of modified means. As here shown, the pivot-pins 25 for the swinging box consist of shoulder-screws which screw into sockets 250 (see Fig. 13) in the side walls of the box and pass through vertical slots 33 in the supports D. As here shown, there need be but one fastener, of which only the inside clamping-head 18 is shown. The shank of the fastener works in a vertical slot 34, parallel with the slots 33, and in a slot 35, communicating with the upper end of slot 34, said slot 35 being curved and concentric with the pins 25 when occupying their highest position in the slots 33. With this construction two separate and independent movements are necessary to enable the back to be swung after unfastening the fastener. It is first necessary to lift the swinging box vertically in a straight line until the shank of the fastener is in the plane of the slot 24, and then the box can be swung on the pivots 25. The initial lift of the box brings the cross-piece 32 thereof clear above the cross-bar 4, as shown in Fig. 12, so that the box can be swung within the limit allowed by slot 24 without coming in contact with the bar 4. The slots 33 and 34 permit the box to be lowered until the bottoms of the parts 4 and 32 are flush with each other, and since these parts are then close to each other no joint-concealing lip or leaf 36 is necessary.

Other modifications of details not affecting the principles of the invention will readily suggest themselves to the skilled mechanic.

We claim as our invention or discovery—

1. A swing-back photographic camera having, in connection with the camera front, and bellows, a swinging camera-box of sufficient size to incase the said camera front and bellows when this latter is collapsed, supports inside of said box on which said box is angularly adjustable, and a camera-bed having a hinge connection with said supports and provided with means for locking it thereto in the extended position, said bed forming when turned up a cover to the mouth of said box, substantially as described.

2. A swing-back photographic camera having, in connection with the camera front, and bellows, a swinging camera-box of sufficient size to incase the said camera front and bellows when this latter is collapsed, an intermediate frame composed of supports inside of said box on which said box is angularly adjustable and of a cross-piece at the bottom of the said box between said supports, and a camera-bed hinged to said cross-piece and provided with means for locking it to said frame in the extended position, said bed forming when turned up a cover to the mouth of said box, substantially as described.

3. A swing-back photographic camera having, in connection with the camera front, and bellows, a swinging camera-box of sufficient size to incase the said camera front and bellows when this latter is collapsed, an intermediate frame composed of supports inside of said box on which said box is angularly adjustable, and of a cross-piece at the bottom of the said box between said supports provided with a portion of the runway for said camera-front, a camera-bed provided with the main portion of said runway and hinged to said frame so that the said cross-piece and the runway thereon form prolongations respectively of the extended bed and the runway thereon, said bed being provided with means for locking it to said frame in the extended position and forming when turned up a cover to the mouth of said box, substantially as described.

4. A swing-back photographic camera having, in connection with the camera front, and bellows, a swinging camera-box of sufficient size to incase the said camera front and bellows when this latter is collapsed, supports inside of said box on which said box is angularly adjustable, and a camera-bed having a hinge connection with said supports and provided with links hinged at one end to said bed and pivotally and slidingly connected at the other with said supports for locking the said bed thereto in the extended position, said bed forming when turned up a cover to the mouth of said box, substantially as described.

5. A swing-back photographic camera having, in connection with the camera front, and bellows, a swinging camera-box of sufficient size to incase the said camera front and bellows when this latter is collapsed, an intermediate frame composed of supports inside of said box on which said box is angularly adjustable and of a cross-piece at the bottom of the said box between said supports, and a camera-bed hinged to said cross-piece and provided with links hinged at one end to said bed and pivotally and slidingly connected at the other with said supports for locking the bed thereto in the extended position, said bed forming when turned up a cover to the mouth of said box, substantially as described.

6. In a swing-back photographic camera, the combination of a swinging camera-box, a device inside of said box for supporting or holding said box in the position to which it may be swung, and a fastener which passes through said device and the wall of said box for clamping them together and which is composed of a nut and a screw, one of them provided with a head inside of said box and the other with a thumb-head exposed on the outside of said box for manipulation by the photographer's fingers, substantially as described.

7. In a swing-back photographic camera, the combination of a swinging camera-box, supports inside of said box on which said box is angularly adjustable, a fastener which passes through one of said supports and the wall of said box for clamping them together and which is composed of a nut and a screw, one of them provided with a head inside of said box and the other with a thumb-head exposed on the outside of said box for manipulation by the photographer's fingers, and a camera-bed having a hinge connection with said supports and provided with means for locking it thereto in the extended position, said bed forming when turned up a cover to the mouth of said box, substantially as described.

8. In a swing-back photographic camera, the combination of a swinging camera-box, a device inside of said box for supporting or holding said box in the position to which it may be swung, and a fastener which passes through said device and the wall of said box for clamping them together and which is composed of a nut and a screw, one of them provided with a head inside of said box and a squared portion fitting in a correspondingly-shaped hole and the other with a thumb-head exposed on the outside of said box for manipulation by the photographer's fingers, substantially as described.

9. In a swing-back photographic camera, in combination with two parts which are movable relatively to each other in swinging the camera back, a double-headed screw-and-nut fastener which passes through both said parts at a point where they have relatively to each other a motion of translation, as opposed to a mere rotation about the axis of said fastener, one of the clamped parts being provided with a slot to permit said motion of translation and one element of the fastener having a squared portion traveling in said slot, the width of the slot corresponding with that of the said squared portion, substantially as described.

10. In a swing-back camera, in combination with the swinging camera-box and a slotted device inside of said box for supporting or holding said box in the position to which it may be swung, a fastener which pasess through the wall of said box and the slot in said inside device at a point where said box has in swinging a motion of translation relatively to said device and which is composed of a nut and a screw, one of them provided with a head inside of said box and a squared portion fitting in the slot of corresponding width in said device and the other of them provided with a thumb-head exposed on the outside of said box for manipulation by the photographer's fingers, substantially as described.

11. A swing-back photographic camera having, in connection with the camera front, and bellows, a swinging camera-box of sufficient size to incase the said camera front and bellows when this latter is collapsed, supports inside of said box on which said box is angularly adjustable, a screw-fastener for clamping together the side of said box and the corresponding inside support, which fastener is located at a point where said box has in swinging a motion of translation relatively to said corresponding support, and a camera-bed having a hinge connection with said supports and provided with means for locking it thereto in the extended position, said bed forming when turned up a cover to the mouth of said box, substantially as described.

12. A swing-back photographic camera, in which the swing-back is pivotally connected with the rest of the camera by means of two pins traveling in guides eccentric to both said pins and interconnected so as to travel together and not independently, substantially as described.

13. A swing-back photographic camera, in which a camera-box of sufficient size to incase the camera-front and collapsed bellows is pivotally connected with supports inside of said box by means of two pins traveling in guides eccentric to both said pins and interconnected so as to travel together and not independently, substantially as described.

14. A swing-back photographic camera, having, in connection with the camera front, and bellows, a swinging camera-box of sufficient size to incase the said camera front and bellows when this latter is collapsed, supports inside of said box on which said box is angularly adjustable, and a camera-bed having a hinge connection with said supports and provided with means for locking it thereto in the extended position, said bed forming when turned up a cover to the mouth of said box, and the said box being pivotally connected with said supports by means of two pins traveling in guides eccentric to both said pins and interconnected so as to travel together and not independently, substantially as described.

15. In a photographic camera, the camera-box of sufficient size to incase the camera-front and the collapsed bellows, which box has its bottom cut away, in combination with an intermediate frame having the cross-piece which forms the bottom of said frame hinged to the camera-bed and located in the cut-away place in the bottom of said box in the same horizontal plane with the remaining portion of the box-bottom, said box being pivotally connected with supports inside of said box, which supports form part of said intermediate frame, substantially as described.

16. In a photographic camera, the camera-box of sufficient size to incase the camera-front and the collapsed bellows, which box has its bottom cut away, in combination with an intermediate frame having the cross-piece which forms the bottom of said frame hinged to the camera-bed and located in the cut-away place in the bottom of said box in the same horizontal plane with the remaining portion of the box-bottom, said box being pivotally connected with supports inside of said box, which supports form part of said intermediate frame, and one of said bottoms being provided with a lip to cover the joint between them, substantially as described.

17. In a photographic camera, the camera-box of sufficient size to incase the camera-front and the collapsed bellows, which box has its bottom cut away, in combination with an intermediate frame having the cross-piece which forms the bottom of said frame hinged to the camera-bed and located in the cut-away place in the bottom of said box in the same horizontal plane with the remaining portion of the box-bottom, said box being pivotally connected with supports inside of said box, which supports form part of said intermediate frame, and the pivotal connection between the said box and the said supports being provided with vertical slots so that the said box can be lifted to bring its bottom above that of said intermediate frame and can be swung when lifted, substantially as described.

18. In combination with the camera-bed, and the camera-box, an intermediate frame composed of a cross-piece to which said bed is hinged and supports with which said box is pivotally connected, said supports being provided with vertical slots so that said box can be lifted relatively to said frame and can be swung by the aid of its pivotal connections with said supports, substantially as described.

19. A swing-back photographic camera having, in combination, a camera-bed, a swing-back, a pivotal connection between said bed and back which is movable relatively to said bed, and means for fastening the swing-back in its different positions of adjustment, substantially as set forth.

20. A swing-back photographic camera having, in combination, a camera-bed, a swing-back, a pivotal connection between said bed and back which is movable relatively to said bed, and a supplementary connection between said back and bed whereby when said back is tilted said pivotal connections automatically move relatively to said bed, substantially as set forth.

In testimony whereof we affix our signatures in presence of two witnesses.

WILLIAM F. CARLTON.
HARVEY W. LOCKE.

Witnesses:
J. M. WALMSLEY,
FRED K. TOWNSEND.